United States Patent [19]

Kojima

[11] Patent Number: 5,201,303
[45] Date of Patent: Apr. 13, 1993

[54] EGR CONTROL DEVICE FOR AN ENGINE

[75] Inventor: Shinji Kojima, Himeji, Japan

[73] Assignee: Mitsubishi Denki Kabushiki Kaisha, Tokyo, Japan

[21] Appl. No.: 899,246

[22] Filed: Jun. 16, 1992

[30] Foreign Application Priority Data

Jul. 12, 1991 [JP] Japan .................................. 3-172193

[51] Int. Cl.⁵ ............................................ F02M 25/06
[52] U.S. Cl. ..................................... 123/704; 123/571
[58] Field of Search ................... 123/704, 571; 60/276

[56] References Cited

U.S. PATENT DOCUMENTS

| | | | |
|---|---|---|---|
| 4,005,689 | 2/1977 | Barnard | 123/704 |
| 4,108,122 | 8/1978 | Barnard | 60/276 |
| 4,191,144 | 3/1980 | Nohira et al. | 123/571 |
| 4,300,516 | 11/1981 | Hayakawa | 123/571 |
| 4,399,791 | 8/1983 | Kobayashi et al. | 123/571 |
| 4,426,986 | 1/1984 | Muller et al. | 123/571 |
| 4,471,745 | 9/1984 | Yoshioka et al. | 123/571 |
| 4,614,175 | 9/1986 | Asayama | 123/704 |
| 4,705,009 | 11/1987 | Asayama | 123/704 |
| 4,727,849 | 3/1988 | Nishida et al. | 123/704 |
| 4,942,860 | 7/1990 | Chujo et al. | 123/704 |

OTHER PUBLICATIONS

"Closed Loop Control of the EGR Rate Using the Oxygen Sensor" Minoru Nishida et al, pp. 1-13, Dec. 1988 SAE.

Primary Examiner—David A. Okonsky
Assistant Examiner—M. Macy
Attorney, Agent, or Firm—Sughrue, Mion, Zinn, Macpeak and Seas

[57] ABSTRACT

An EGR control device for an engine comprising: an exhaust gas recirculating passage for connecting an exhaust pipe to an intake pipe of an internal combustion engine; an exhaust gas recirculating valve provided at the exhaust gas recirculating passage for controlling a quantity of exhaust gas which is recirculated to intake air of an engine; an oxygen sensor provided at an intake passage on the downstream side of a junction point of the recirculated gas and the intake air for detecting an oxygen concentration of the intake air mixed with the recirculated gas; an exhaust gas recirculating valve passage area controlling means for controlling a passage area of the exhaust gas recirculating valve; a running state detecting means for detecting a running state of the engine; a calculating means for calculating a first exhaust gas recirculation ratio based on an output of the oxygen sensor and for calculating a second exhaust gas recirculation ratio corresponding to a value detected by the running state detecting means; and a feedback controlling means for performing a feedback control which increases or decreases the passage area of the exhaust gas recirculation valve so that the first exhaust gas recirculation ratio agrees with the second exhaust gas recirculation ratio.

6 Claims, 10 Drawing Sheets

EGR CONTROL DEVICE FOR AN ENGINE

BACKGROUND OF THE INVENTION

1. FIELD OF THE INVENTION

This invention relates to an EGR control device for an engine which performs a control wherein a portion of exhaust gas of an internal combustion engine is recirculated to an intake pipe of the internal combustion engine.

2. DISCUSSION OF BACKGROUND

Conventionally, an exhaust gas recirculation control device (hereinafter, EGR control device) performing a control of exhaust gas recirculation (hereinafter, EGR) as a means of decreasing $NO_x$ in the exhaust gas of the internal combustion engine, has widely been used. This EGR control device performs the control of EGR by an exhaust pressure control system utilizing a BPT (Back Pressure Transducer) valve.

Since the above-mentioned conventional EGR control device is constructed by using a BPT valve or the like, it can not detect an exhaust gas recirculation quantity, that is, an EGR flow quantity. As a result, when the EGR flow quantity is increased by deterioration of the BPT valve or the like, the drivability is worsened. Furthermore, when the EGR flow quantity is decreased, the $NO_x$ component in the exhaust gas is increased since the temperature of the engine is elevated.

Furthermore, even when this device is in an abnormal state by deteriorations of parts of the EGR control device, this abnormality is hard to be detected.

SUMMARY OF THE INVENTION

It is an object of the present invention to provide an EGR control device for an engine capable of performing an accurate control in accordance with a running state of the engine.

It is an object of the present invention to provide an EGR control device capable of performing an accurate control without worsening the exhaust gas irrespective of a deterioration of an exhaust gas recirculation valve or the like.

It is an object of the present invention to provide an EGR control device for an engine capable of performing an accurate failure determination.

It is an object of the present invention to provide an EGR control device for an engine capable of reliably performing a failure detection.

According to the first aspect of the present invention there is provided an EGR control device for an engine comprising: an exhaust gas recirculating passage for connecting an exhaust pipe to an intake pipe of an internal combustion engine; an exhaust gas recirculating valve provided at the exhaust gas recirculating passage for controlling a quantity of exhaust gas which is recirculated to intake air of an engine; an oxygen sensor provided at an intake passage on the downstream side of a junction point of the recirculated gas and the intake air for detecting an oxygen concentration of the intake air mixed with the recirculated gas; an exhaust gas recirculating valve passage area controlling means for controlling a passage area of the exhaust gas recirculating valve; a running state detecting means for detecting a running state of the engine; a calculating means for calculating a first exhaust gas recirculation ratio based on an output of the oxygen sensor and for calculating a second exhaust gas recirculation ratio corresponding to a value detected by the running state detecting means; and a feedback controlling means for performing a feedback control which increases or decreases the passage area of the exhaust gas recirculation valve so that the first exhaust gas recirculation ratio agrees with the second exhaust gas recirculation ratio.

According to the second aspect of the present invention there is provided the EGR control device for an engine according to the first aspect 1, further comprising the first memorizing means for memorizing a first feedback correction value when the feedback-controlling is performed.

According to the third aspect of the present invention there is provided the EGR control device for an engine according to the first aspect, further comprising a first memorizing means for memorizing a first feedback correction value when the feedback controlling is performed; and a second memorizing means for memorizing a second feedback correction value which is a further corrected value of the first feedback correction value when the feedback-controlling is performed utilizing the first feedback correction value memorized by the first memorizing means.

According to the fourth aspect of the present invention there is provided the EGR control device for an engine according to the first aspect 1, further comprising a failure determining means for determining a failure by detecting that the first exhaust gas recirculation ratio disagrees with the second exhaust gas recirculation ratio.

According to the fifth aspect of the present invention there is provided the EGR control device for an engine according to the second or the third aspect, further comprising a failure detecting means for detecting a failure when the first feedback correction value or the second feedback correction value exceeds a first predetermined range or exceeds a second predetermined range obtained by parameters of the engine.

According to the sixth aspect of the present invention there is provided the EGR control device for an engine according to the first aspect, further comprising a failure detecting device for detecting a failure when a difference between the first feedback correction value and the second feedback correction value exceeds a third predetermined range or a fourth predetermined range obtained by parameters of the engine.

In the first aspect of the invention, the device detects the oxygen concentration in the intake air of the engine mixed with the recirculated exhaust gas by the oxygen sensor, and performs a feedback control by means of controlling the recirculated exhaust gas based on the output signal of the oxygen sensor, thereby controlling it in accordance with the running state of the engine.

In the second aspect of the invention, the device performs an accurate feedback control by memorizing the feedback correction value in the feedback control by the first memorizing means, without worsening the exhaust gas due to an age deterioration of the exhaust gas recirculation valve of the like.

In the third aspect of the invention, the device performs the accurate feedback control, when the device performs the feedback control utilizing the first feedback correction value by memorizing the second feedback value which further corrects the first feedback value, in the second memorizing means, and without worsening the exhaust gas due to an age deterioration of the exhaust gas recirculation valve or the like.

In the fourth aspect of the invention, the device performs the failure determination by detecting that the first exhaust gas recirculation ratio disagrees with the second exhaust gas recirculation ratio by the failure determining means.

In the fifth aspect of the invention, the failure detecting means performs the failure detection by detecting that the first or the second feedback correction value exceeds a predetermined range, or exceeds a predetermined range obtained by the engine parameters.

In the sixth aspect of the invention, the failure detecting means performs the failure detection by detecting that a difference between the first and the second exhaust gas recirculation ratios exceeds a predetermined range, or exceeds a range obtained from the engine parameters.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
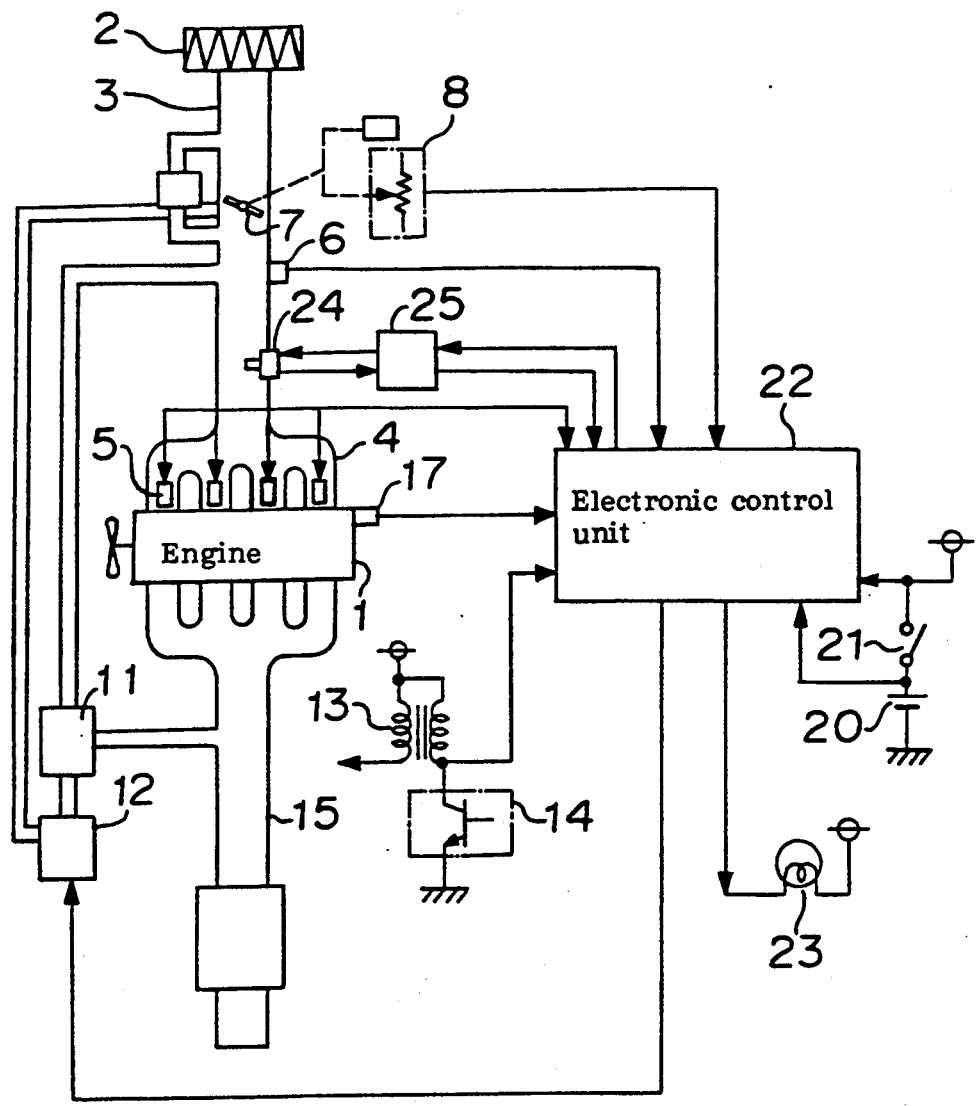
FIG. 1 is a block diagram showing an embodiment of an EGR control device.

Next, explanation will be given to an embodiment of an EGR control device for an engine of this invention referring to the drawings.

FIG. 1 is a block diagram showing an embodiment thereof. In FIG. 1, a reference numeral 1 designates an engine, 2, an air cleaner, 3, an intake pipe, 4, an intake manifold, 5, an injector, 6, a pressure sensor, 7, a throttle valve, 8, a throttle opening degree sensor, 11, an exhaust gas recirculating valve (hereinafter recirculating valve), 12, a passage area control actuator (hereinafter, EGR solenoid), 13, an ignition coil, 14, an ignitor, 15, an exhaust pipe, 17, a water temperature sensor, 20, a battery, 21, an ignition key switch, 22, an electronic control unit, 23, an alarming lamp, 24, an oxygen sensor and 25, an oxygen concentration detecting device.

In FIG. 1, the pressure sensor 6 is a semiconductor type pressure sensor which detects an intake air pressure for measuring an air quantity sucked to the engine 1 through the intake pipe 3 and the intake manifold 4.

Each of the injectors 5 is provided to the intake manifold 4 at adjacent to each exit to the respective cylinders, and supplies fuel to the engine 1 by control of the electronic control unit 22. The water temperature sensor 17 is a thermistor type sensor which detects a cooling water temperature of the engine 1.

The ignition coil 13 performs ignition by a signal from the ignitor 14, and transmits the generated ignition signal to the electronic control unit 22.

The recirculating valve 11 is a vacuum servo type valve installed at an exhaust gas recirculation passage which connects the intake pipe 3 with the exhaust pipe 15.

The EGR solenoid 12 is connected to a diaphragm chamber of the recirculating valve 11 and the intake pipe 3, and controls a negative pressure of the diaphragm chamber of the recirculating valve 11 by a signal from the electronic control unit 22. A passage area of the recirculating valve 11 becomes variable by the negative pressure of the diaphragm chamber.

Next, the electronic control unit 22 controls the passage area of the recirculating valve 11 by receiving respective signals of the pressure sensor 6, the throttle opening degree sensor 8, the ignition coil 13 and the water temperature sensor 17, as signals of a running state detecting means.

Accordingly, the electronic control unit 22 controls to drive the EGR solenoid 12 by obtaining a control quantity of the EGR solenoid for controlling the EGR quantity and has a function as a feedback control means.

The oxygen concentration sensor 24 is provided on the downstream side of a junction point of the recirculation (EGR) gas and the intake air, and detects an oxygen concentration of the intake air mixed with the EGR gas.

The electronic control unit 22 receives an output of the oxygen sensor 24 through the oxygen concentration detecting device 25 and has a function as a calculating means for calculating an EGR ratio.

Figure 2:
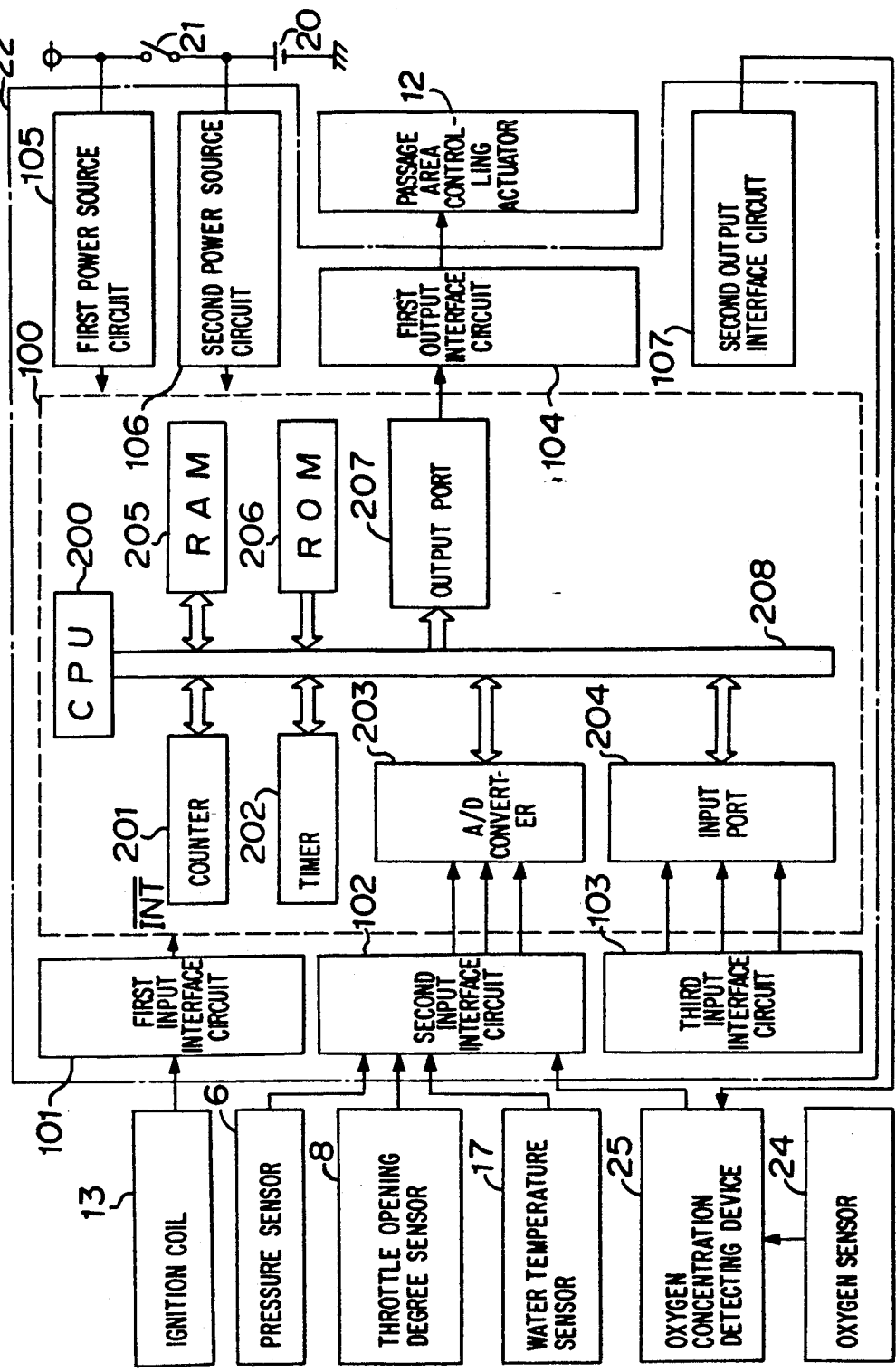
FIG. 2 is a block diagram showing an electronic control unit of the embodiment in FIG. 1.

FIG. 2 is a detailed block diagram of the electronic control unit 22. In FIG. 2, a reference numeral 100 designates a microcomputer, which is composed of a function of a calculating means for calculating a control quantity of the EGR solenoid or the like in accordance with a predetermined program, a CPU 200 having a failure determining function, a free running counter 201 for measuring a revolution period of the engine 1, a timer 202 for timewisely measuring a duty ratio of a driving signal applied to the EGR solenoid, an A/D-convertor 203 for converting an analog input signal to a digital signal, a RAM 205 utilized as a work memory which memorizes various feedback correction values or the like, a ROM 206 wherein programs are memorized, an output port 207 for outputting the driving signals and a common bus 208.

A numeral 101 designates a first input interface circuit, which outputs a primary side signal shaped of its waveform of the ignition coil 13, to the microcomputer 100 as an interruption signal.

When the interruption signal is generated, the CPU 200 reads a value of the counter 201, calculates a period of the engine revolution number by a difference between the current read value and a preceding read value and memorizes it in the RAM 205.

A numeral 102 designates a second input interface circuit, which receives respective signals of the pressure sensor 6, the throttle opening degree sensor 8, the water temperature sensor 17 and the like, and output them to the A/D convertor 203.

A numeral 104 designates a first output interface circuit, which amplifies a driving output from the output port 207 and output it to the EGR solenoid 12.

An output of the oxygen sensor 24 is inputted to the second input interface 102 through the oxygen concentration detecting device 25. A numeral 107 designates a second output interface, which controls a reference voltage ($V_R$) of the oxygen concentration detecting device 25.

A numeral 103 designates a third input interface circuit, of which output is transmitted to the common bus 208 through the input port 204.

The battery 20 and the ignition switch 21 are connected to a power line and the ground in series. A junction point of the power line and the ignition switch 21 is connected to a first power source circuit 105. A connection point of the battery 20 and the ignition switch 21 is connected to a second power source circuit 106.

The first power source circuit 105 and the second power source circuit 106 supply power to the microcomputer 100.

Figure 3:
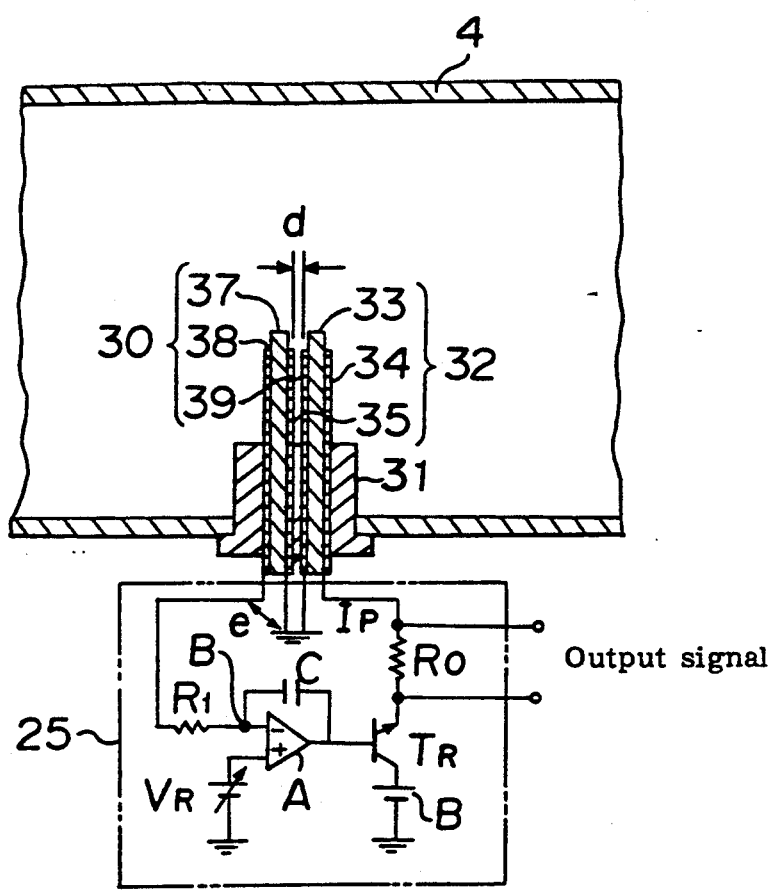
FIG. 3 is a construction diagram of an oxygen sensor and an oxygen concentration detecting device in the embodiment in FIG. 1.

FIG. 3 is a detailed construction diagram of the oxygen sensor 24 and the oxygen concentration detecting device 25. The construction of the oxygen sensor 24 is already publicly known (Japanese Unexamined Patent Publication No. 138263/1985). A brief explanation will be given to detection of the EGR ratio utilizing the oxygen sensor 24.

In FIG. 3, numerals 33 and 37 designate solid electrolytes (Zirconia), to respective both sides of which platinum electrodes 34 and 35, and 38 and 39, are provided.

An oxygen pump 32 is constructed by the solid electrolyte 33 and the platinum electrodes 34 and 35. An oxygen concentration cell 30 is constructed by the solid electrolyte 37 and the platinum electrodes 38 and 39. Both are opposedly provided interposing a very small clearance "d" of about 0.1 mm.

In this way, the oxygen sensor 24 is constructed by the oxygen concentration cell 30, the oxygen pump 32 and a supporting element 31. The oxygen sensor 24 is supported by the supporting element 31 and is attached to the intake manifold 4.

The oxygen concentration detecting device 25 is constructed as in FIG. 3, drives a transistor $T_R$ by an output of a differential integral amplifier composed of a resistance $R_1$, a condenser C and a calculation amplifier A, controls a pump current $I_P$ flowing in the platinum electrodes 34 and 35 of the oxygen pump 32, and has a voltage "e" generated between the platinum electrodes 38 and 39 of the oxygen concentration cell 30, agree with a difference voltage $V_R$, as an input terminal voltage B.

A resistance $R_O$ is connected to an emitter of the transistor $T_R$ and the platinum electrode 34, whereby an output voltage corresponding to the pump current $I_P$ which is in proportion to the oxygen concentration in the intake air of the intake manifold 4 mixed with the exhaust gas, is obtained.

Figure 4:
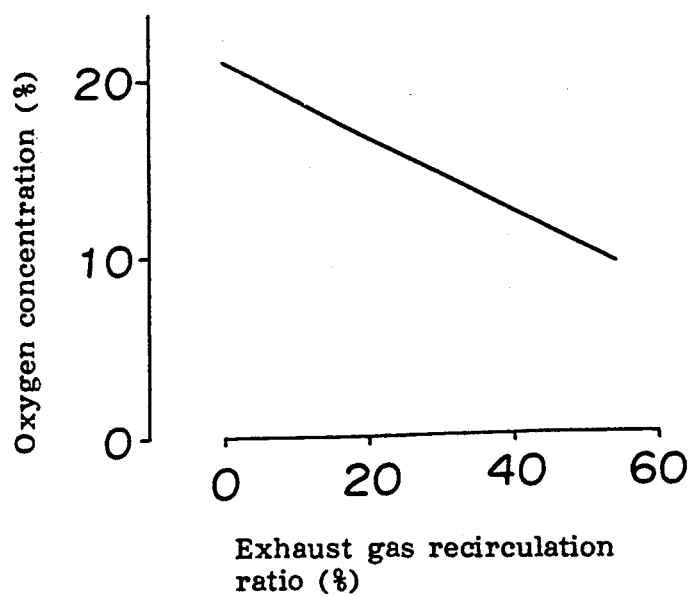
FIG. 4 is a characteristic diagram showing a relationship between the oxygen concentration and an exhaust gas recirculation ratio for explaining the embodiment in FIG. 1.

FIG. 4 is a characteristic diagram showing a relationship between the oxygen concentration of the intake air mixed with the recirculated exhaust gas, and a mixing ratio (EGR ratio) of the exhaust gas. According to FIG. 4, the oxygen concentration changes in inverse proportion to the exhaust gas EGR ratio.

Figure 5:
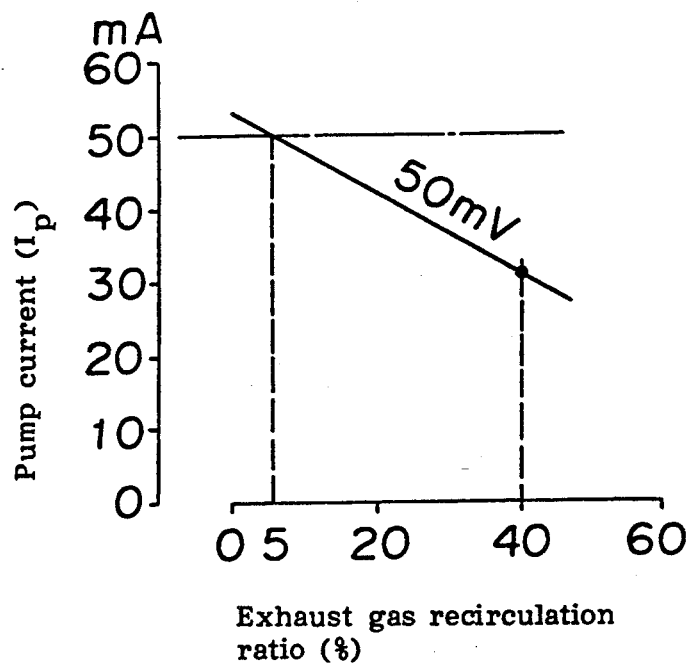
FIG. 5 is a characteristic diagram showing a relationship between a pump current and an EGR ratio for explaining the embodiment in FIG. 1.

FIG. 5 is a characteristic diagram showing a relationship between the pump current $I_P$ and the EGR ratio. This characteristic diagram shows a change of the pump current when the EGR ratio of the engine 1 is changed, while maintaining the reference voltage $V_R$ at 50 mV. According to the characteristic diagram 5, the pump current $I_P$ changes in inverse proportion to the EGR ratio.

Figure 6:
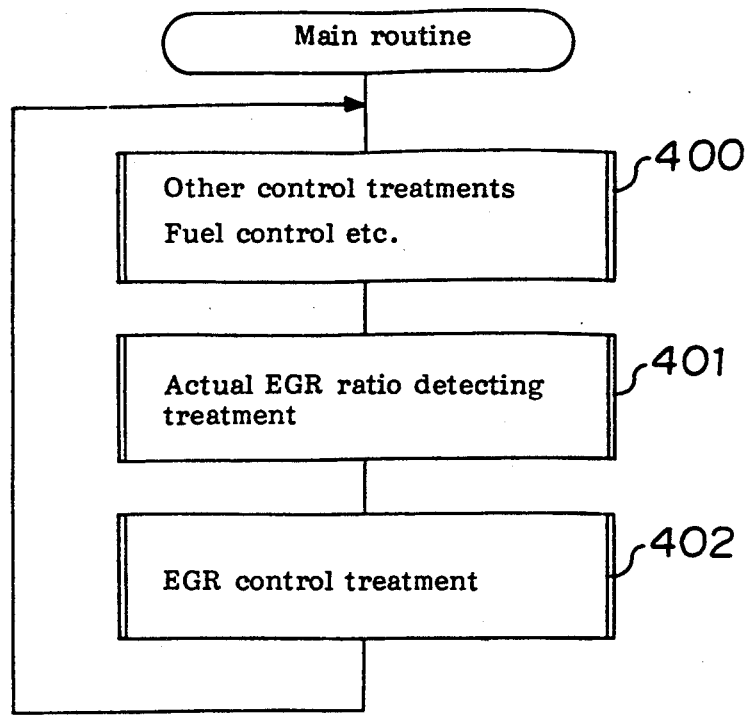
FIG. 6 is a flowchart showing a treatment of a main routine for explaining the operation of the embodiment in FIG. 1.

Next, explanation will be given to the operation of the CPU 200 of the above constructed EGR control device referring to flowcharts. FIG. 6 shows a treatment of a main routine.

In step 400, the operation performs other control treatments. In step 401, the operation performs an actual EGR ratio detecting treatment for detecting an actual EGR ratio in a running state of the engine. In step 402, the operation performs an EGR control treatment based on the actual EGR ratio detected in step 401, and goes back to step 400.

Figure 7:
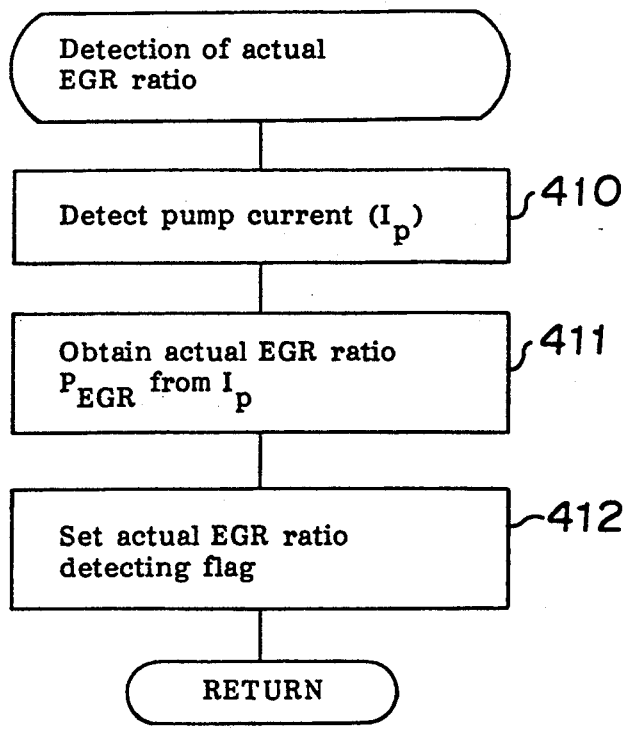
FIG. 7 is a flowchart of an actual EGR ratio detecting treatment in the embodiment in FIG. 1.

Next, explanation will be given to the actual EGR ratio detecting treatment of FIG. 7. In step 410, the operation reads the pump current $I_P$ by A/D-converting both terminals voltage of the resistance $R_o$ in the oxygen concentration detecting device 25. In step 411, the operation obtains the actual EGR ratio $P_{EGR}$ by the relationship between the pump current $I_P$ and the EGR ratio shown in FIG. 5. In step 412, the operation sets an actual EGR ratio detection flag.

Figure 8:
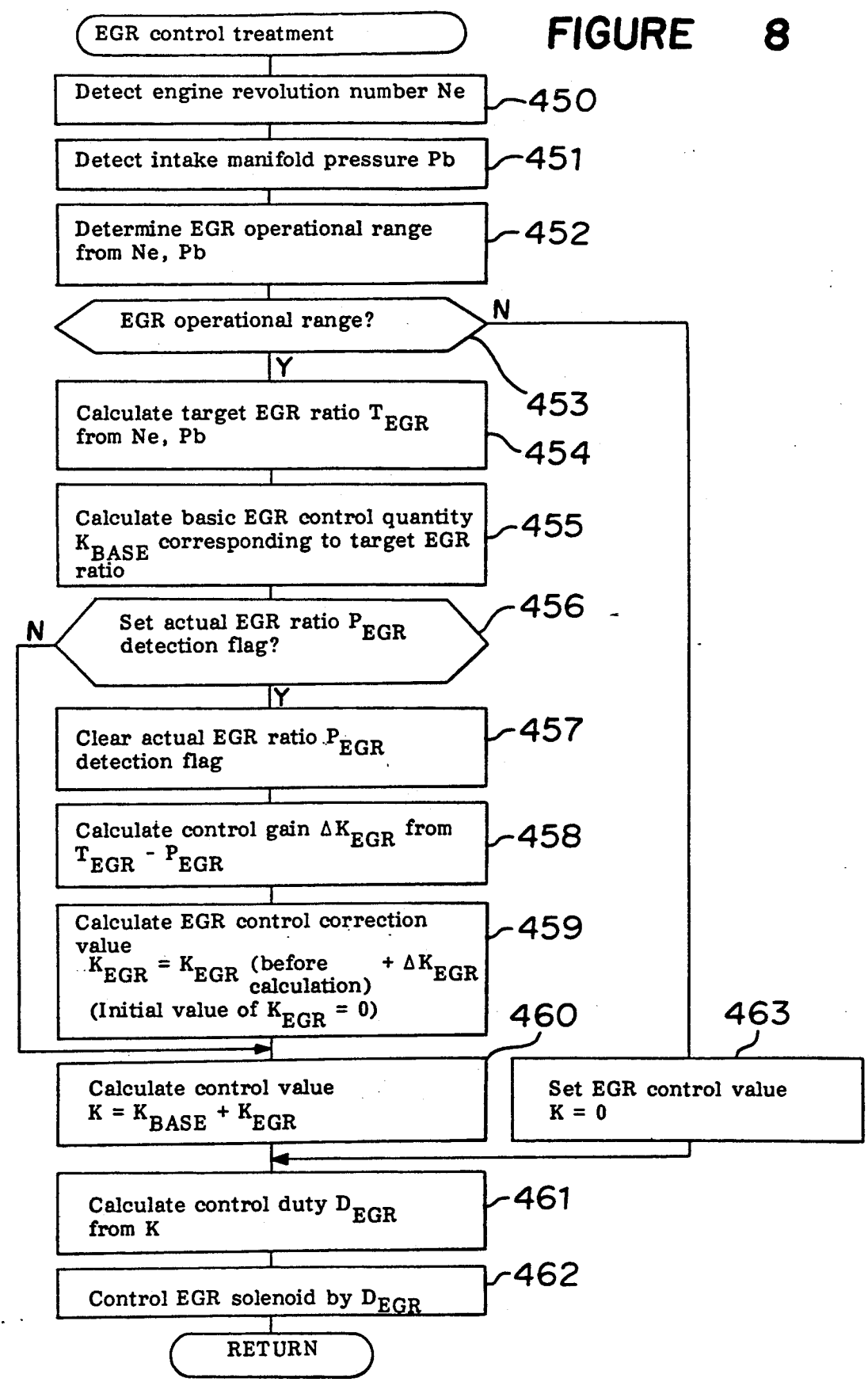
FIG. 8 is a flowchart of an EGR control treatment in the embodiment in FIG. 1.

When the actual EGR ratio $P_{EGR}$ is calculated, the actual EGR control treatment shown in FIG. 8 is performed, based on the actual EGR ratio. In step 450, the operation detects an engine revolution number Ne, and successively detects an intake manifold pressure Pb in step 451.

Next, the operation determines an EGR operational range based on the engine revolution number Ne and the intake manifold pressure Pb in step 452. In step 453, the operation determines whether the engine is in the EGR operational range. When the engine is in the EGR operational range as a result of this determination, the operation calculates a target EGR ratio (a second EGR ratio) based on the engine revolution number Ne and the intake manifold pressure Pb in step 454. In step 455, the operation calculates a basic EGR control quantity $K_{BASE}$ corresponding to the target EGR ratio $T_{EGR}$.

In step 456, the Operation determines whether the actual EGR ratio detection flag is set. When it is set, the operation resets the actual EGR ratio detection flag in step 457. In step 458, the operation calculates a control gain $\Delta K_{EGR}$ by a value of the target EGR ratio $T_{EGR}$ subtracted by the actual EGR ratio $P_{EGR}$, based on a graph shown in FIG. 9.

Figure 9:
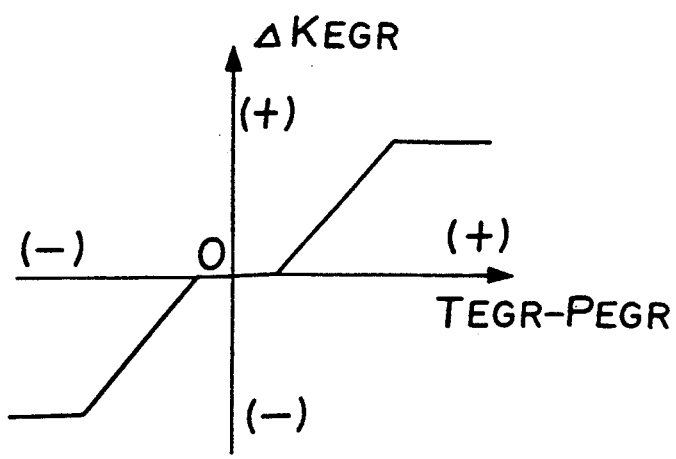
FIG. 9 is a characteristic diagram of (target EGR ratio—actual EGR ratio) versus a control gain for explaining the embodiment in FIG. 1.

FIG. 9 is a graph showing a characteristic of the control gain $\Delta K_{EGR}$. A value of the target EGR ratio $T_{EGR}$ subtracted by the actual EGR ratio $P_{EGR}$ is denoted in abscissa, and a value of the control gain $\Delta K_{EGR}$ corresponding to the abscissa value, in ordinate, respectively.

In step 459, the operation calculates an EGR control correction value wherein the control gain $\Delta K_{EGR}$ is added with the EGR control correction value $K_{EGR}$ before calculation.

Figure 10:
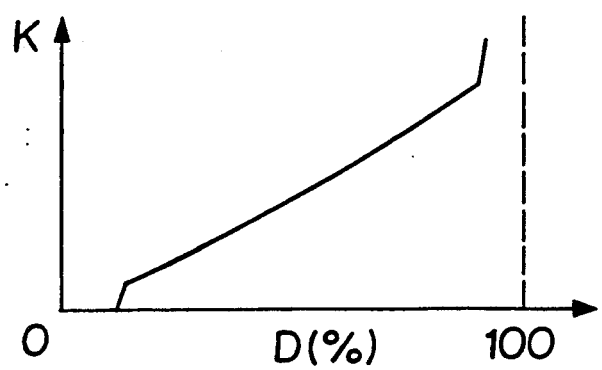
FIG. 10 is a characteristic diagram showing a relationship between an EGR control value versus a control duty for explaining the embodiment in FIG. 1.

In step 460, the operation calculates an EGR control value K of the EGR control correction value obtained in step 459, added with the basic control quantity $K_{BASE}$. In step 461, the operation Calculates a control duty $D_{EGR}$ from the obtained EGR control value K, based on a graph showing a relationship between the EGR control value K and the control duty D shown in FIG. 10. In step 462, the operation drives the EGR solenoid 12 based on the control duty $D_{EGR}$.

In this way, a deviation between the target EGR ratio $T_{EGR}$ and the actual EGR ratio $P_{EGR}$ is nullified and the target EGR ratio $T_{EGR}$ agrees With the actual EGR ratio $P_{EGR}$.

Figure 11:
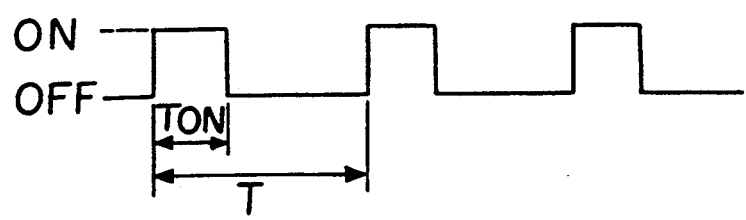
FIG. 11 is an explanatory diagram showing the definition of the control duty for explaining the embodiment in FIG. 1.

FIG. 11 is an explanatory diagram showing the definition of the control duty D. Assuming ON time as $T_{ON}$, and a period as T, the control duty D is shown by the following equation.

$$D=(T_{ON}/T)\times 100\ (\%)$$

Furthermore, when the engine is out of the EGR operational range, for instance, in an idling state, and when the operation determines as "N" in step 453, the operation sets the EGR control quantity K as 0 in step 463, to nullify the EGR control quantity, and calculates the control duty $D_{EGR}$ from the EGR control quantity of 0, in step 461.

When the actual EGR ratio detection flag is not set, and the operation determines as "N" in step 456, the operation proceeds to step 460. In step 460, the operation calculates the EGR control quantity value based on the EGR control correction value $K_{EGR}$ which is not added With the control gain $\Delta K_{EGR}$, and the basic EGR control quantity $K_{BASE}$, based on which successive treatments are performed in step 461 and so on.

Figure 12:
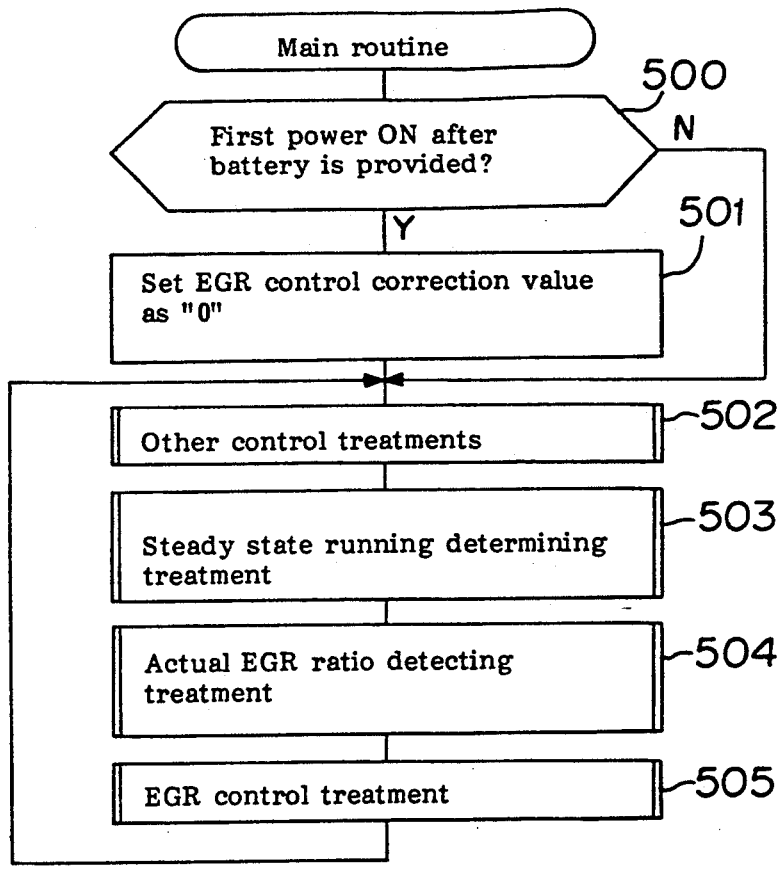
FIG. 12 is a flowchart of a main routine of a second embodiment of an EGR control device for an engine according to the present invention.
Figure 13:
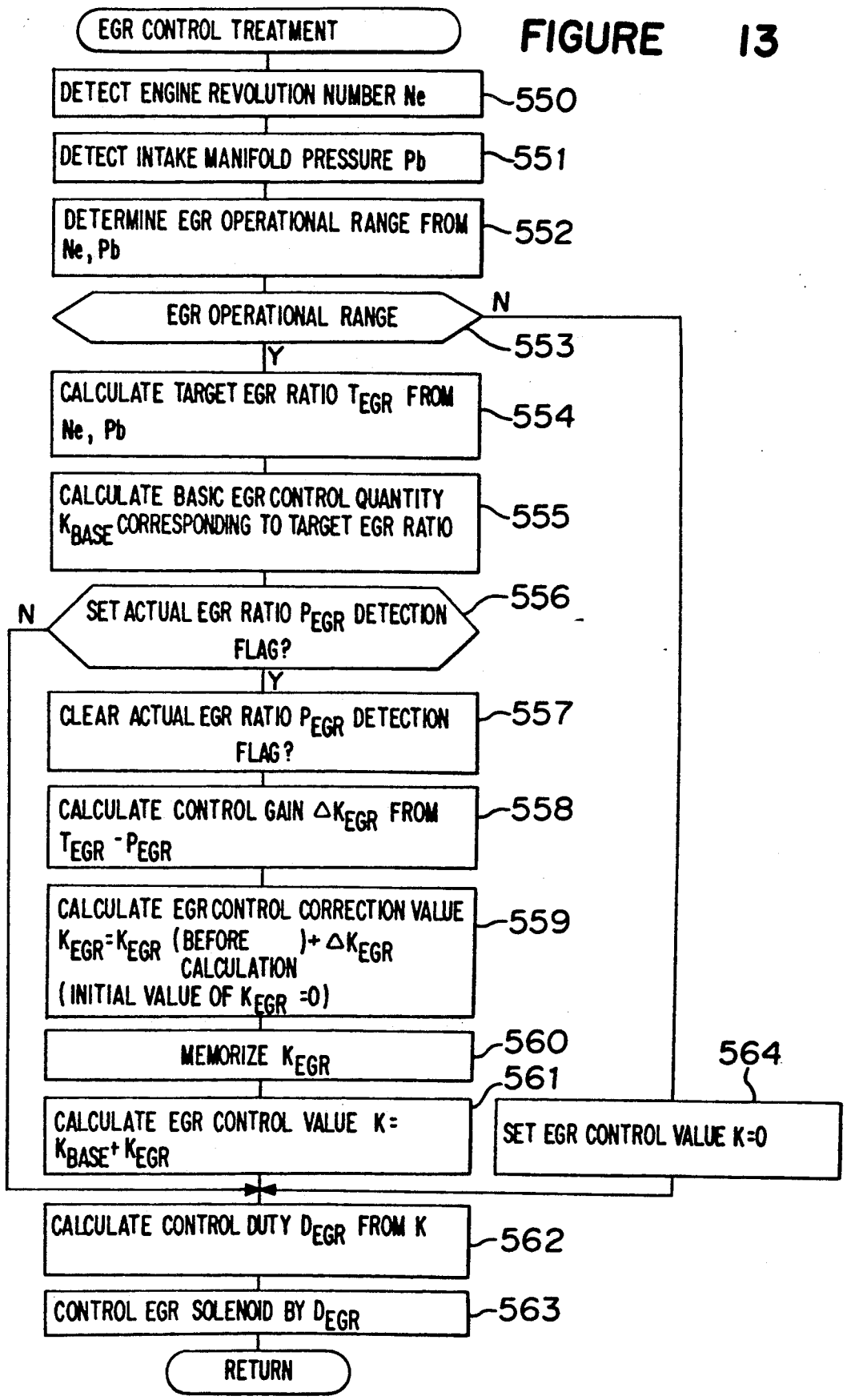
FIG. 13 is a flowchart of an EGR control treatment of the second embodiment.

FIGS. 12 and 13 are flowcharts showing the operation of a second embodiment of the EGR control device of this invention. Explanation will be given to the flowchart of FIG. 12.

In step 500, the operation determines whether first power is ON after the battery 20 is provided. The operation determines it by detecting an output voltage of the second power source circuit 106 connected to the battery 20 is changed from a low voltage value to a high voltage value.

When the operation determines as "Y" as a result of the determination, the operation sets the EGR control correction value $K_{EGR}$ as 0 in step 501. In step 502, the operation performs the other control treatments. In step 503, the operation performs a steady state running determining treatment. In step 504, the operation performs an actual EGR ratio detecting treatment. In step 505, the operation determines the EGR control treatment.

Furthermore, when the operation determines that the first power is ON after the battery 20 is provided in step 500, as "N", that is, when the battery 20 is already provided, and only the ignition switch 21 is turned on, the operation does not set the EGR control correction value $K_{EGR}$ as 0, and utilizes the EGR control correction value $K_{EGR}$ already memorized in the RAM 205 in the succeeding treatments of step 502 and so on.

Next, explanation will be given to a flowchart of FIG. 13. The treatment in steps 550 through 559 in this flowchart, is the same as that in steps 450 through 459 of the flowchart in FIG. 8, and a detailed explanation will be omitted.

That is, in steps 550 through 559, the operation calculates the EGR control correction value $K_{EGR}$ in the EGR operational range. In step 560, the operation memorizes the calculated EGR control correction value $K_{EGR}$. In step 561, the operation calculates the EGR control value K based on the EGR control correction value obtained in step 559, added with the basic control quantity $K_{BASE}$. In step 562, the operation calculates the control duty $D_{EGR}$ based on the obtained EGR control value K. In step 563, the Operation drives the EGR solenoid 12 based on the control duty $D_{EGR}$.

In this way, the operation memorizes the EGR control correction value $K_{EGR}$ when it is calculated. In case that, when power is ON in this device, it is not the first power ON after the battery 20 is provided, the operation utilizes the memorized EGR control correction value $K_{EGR}$ as a correction value before calculation. Accordingly, an accurate EGR control can be performed instantly after the ignition switch 21 is turned ON. When the engine is out of the EGR operational range in step 553, the operation sets the EGR control value K as 0 in step 564, and calculates the control duty $D_{EGR}$ from the EGR control value of 0, in step 562.

Figure 16:
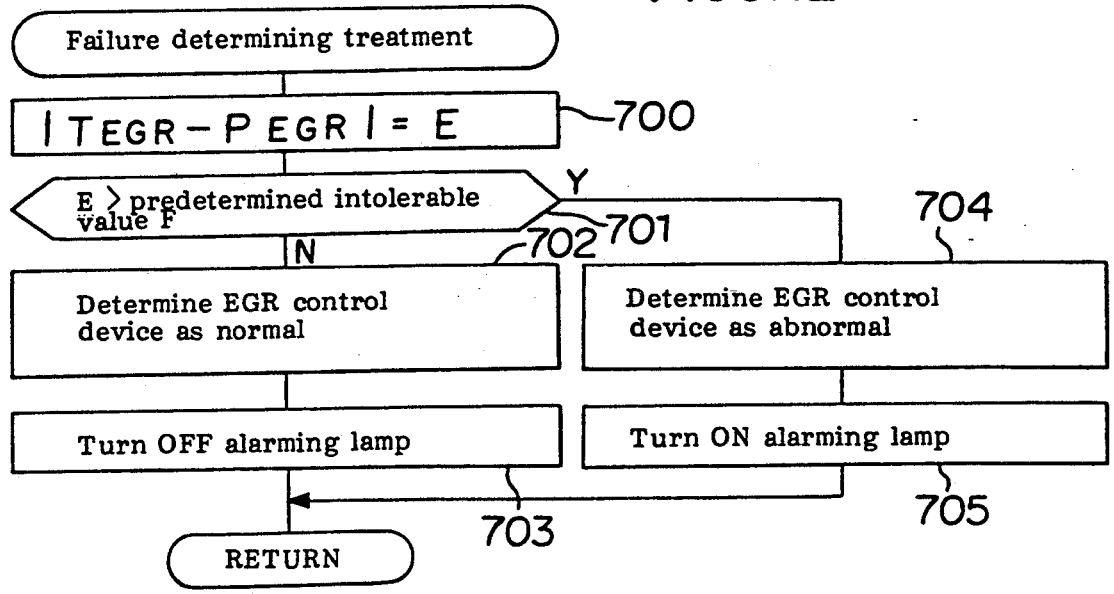
FIG. 16 is a flowchart of another embodiment of a failure determining treatment in an EGR control device for an engine according to the present invention.
Figure 14:
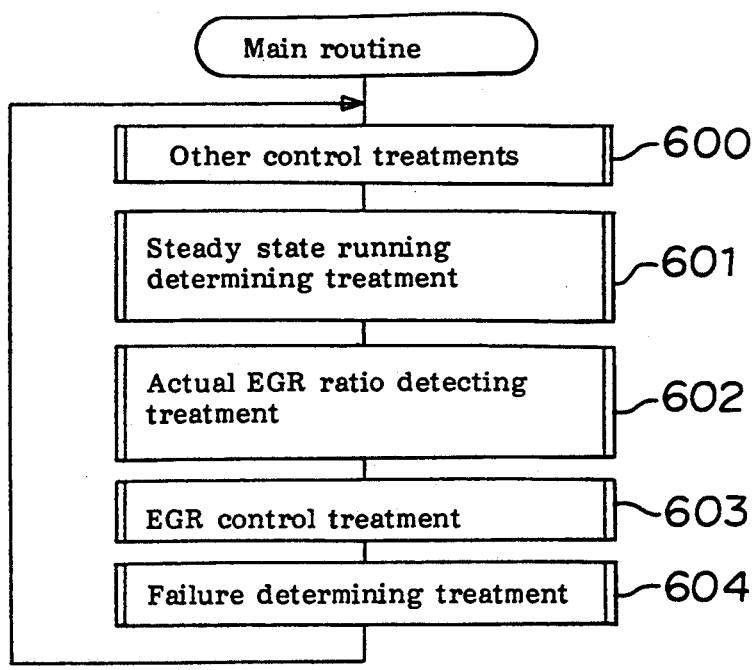
FIG. 14 is a flowchart of a main routine of a third embodiment of an EGR control device for an engine according to the present invention.
Figure 15:
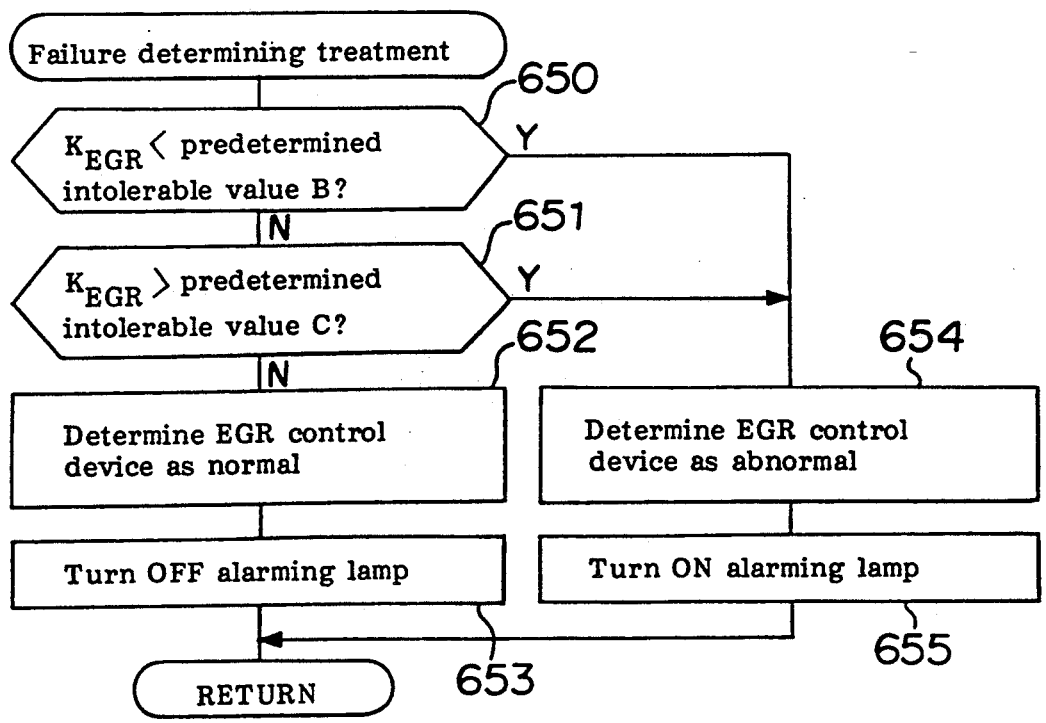
FIG. 15 is a flowchart of the third embodiment of a failure determining treatment.

FIGS. 14 through 16 are flowcharts showing the operation of a third embodiment of the EGR control device of this invention. First, explanation will be given to a flowchart of FIG. 14.

In steps 600 through 603, in FIG. 14, the operation successively performs the other control treatment, the actual EGR ratio detecting treatment and the EGR control treatment, as in steps 400 through 402 of the flowchart of FIG. 6.

After the EGR control treatment in step 603, is performed, the operation performs a failure determining treatment for determining a failure of the device in step 604, and returns to step 600.

Next, explanation will be given to a flowchart of FIG. 15 concerning a detailed failure determining treatment of this device. In FIG. 15, the operation performs a determination whether the EGR control correction value $K_{EGR}$ is smaller than a predetermined intolerable value B, as a result of for instance, an exhaust gas test, in step 650. When it is larger than the predetermined value B, the operation performs a determination whether the EGR control correction value $K_{EGR}$ is larger than a predetermined intolerable value C, as a result of for instance, the exhaust gas test in step 651. When it is smaller than the predetermined value C, the operation determines the EGR control device as normal and sets a flag meaning the normality in step 652, and turns off the alarming lamp 23 in step 653.

Furthermore, when the EGR control correction value $K_{EGR}$ is smaller than the predetermined value B, and the Operation determines as "Y" in step 650, or, when the EGR control correction value $K_{EGR}$ is larger than the predetermined value C, and the operation determines as "Y" in step 651, the operation determines the EGR control device as abnormal in step 654 and sets a flag meaning the abnormality, and turns on the alarming lamp 23 in step 655.

Accordingly, this invention determines that the EGR control device is in failure when the target EGR ratio $T_{EGR}$ disagrees with the actual EGR ratio $P_{EGR}$.

Next, explanation Will be given to another embodiment of the failure determination of the EGR control device based on a flowchart of FIG. 16. In step 700 of FIG. 16, the operation determines an absolute value of a value of the target EGR ratio $T_{EGR}$ subtracted by the actual EGR ratio $P_{EGR}$, as E. In step 701, the operation determines whether the absolute value E is larger than a predetermined intolerable value F as a result of for instance, an exhaust gas test.

When the absolute value E is smaller than the predetermined value F, the operation determines the EGR control device as normal in step 702, and sets a flag meaning the normality, and turns off the alarming lamp 23 in step 703.

Furthermore, when the absolute value E is larger than the predetermined value F, and the operation determines as "Y" in step 701, the operation determines the EGR control device as abnormal in step 704, sets a flag meaning the abnormality, and turns on the alarming lamp 23 in step 705.

In this embodiment, a comparison is made between the absolute value E and the predetermined value F showing a deviation of the target EGR ratio $T_{EGR}$ deviated from the actual EGR ratio $P_{EGR}$, and as a result, the Operation instantly determines the failure of the device. However, the operation may determine the failure of the device after the large-or-small relationship of the absolute value E with respect to the predetermined value F continues for a constant time, by introducing a time counting means of the timer 202.

The operation may determine the failure by using the counter 201, and by counting number of time wherein the device is determined as abnormal in the failure determination of steps 650 and 651 in FIG. 15, and when the abnormality continues for a predetermined number of times.

As stated above, according to the first aspect of the invention, since the passage area of the recirculating valve is controlled to increase or decrease so that the first EGR ratio agrees with the second EGR ratio, an accurate recirculation control of the exhaust gas in accordance with the various running states, can be performed.

According to the second aspect of the invention, since it is constructed to memorize the first feedback correction value to the first memorizing means when the feedback control is performed so that the deviation between the first EGR ratio and the second EGR ratio is nullified, it can perform an accurate control without deteriorating the exhaust gas due to the age deterioration of the EGR valve or the like.

According to the third aspect of the invention, since it is constructed to memorize the second feedback correction value to the second memorizing means which further corrects the first feedback correction value when the feedback control is performed by utilizing the first feedback correction value memorized in the first memorizing means, the invention has an effect of performing the control more accurately without worsening the exhaust gas due to the age deterioration of the EGR valve or the like.

According to the fourth aspect of the invention, since it is constructed to determine the failure when the first EGR ratio disagrees with the second EGR ratio by the failure determining means, the invention has an effect wherein the failure of the device can directly and accurately be detected.

According to the fifth aspect of the invention, since it is constructed to detect the failure when the first or the second feedback correction value exceeds a predetermined range or when a difference between the actual EGR ratio and the target EGR ratio obtained by parameters of the engine, exceeds a predetermined range, the failure of the device can directly and accurately be detected as above.

According to the sixth aspect of the invention, since the failure is determined by the failure detecting means when a difference between the first EGR ratio and the second EGR ratio exceeds a predetermined range, or when the EGR ratio obtained by parameters of the engine exceeds a predetermined range, the invention has an effect wherein the failure of the device can directly and accurately be detected.

Obviously, numerous modifications and variations of the present invention are possible in light of the above teachings. It is therefore to be understood that within the scope of the appended claims, the invention may be practiced otherwise than as specifically described herein.

What is claimed is:

1. An EGR control device for an engine comprising:
    an exhaust gas recirculating passage for connecting an exhaust pipe to an intake pipe of an internal combustion engine;
    an exhaust gas recirculating valve provided at the exhaust gas recirculating passage for controlling a quantity of exhaust gas which is recirculated to intake air of an engine;
    an oxygen sensor provided at an intake passage on the downstream side of a junction point of the recirculated gas and the intake air for detecting an oxygen concentration of the intake air mixed with the recirculated gas;
    an exhaust gas recirculating valve passage area controlling means for controlling a passage area of the exhaust gas recirculating valve;
    a running state detecting means for detecting a running state of the engine;
    a calculating means for calculating a first exhaust gas recirculation ratio based on an output of the oxygen sensor and for calculating a second exhaust gas recirculation ratio corresponding to a value detected by the running state detecting means; and
    a feedback controlling means for performing a feedback control which increases or decreases the passage area of the exhaust gas recirculation valve so that the first exhaust gas recirculation ratio agrees with the second exhaust gas recirculation ratio.

2. The EGR control device for an engine according to claim 1, further comprising a first memorizing means for memorizing the first feedback correction value when the feedback controlling is performed.

3. The EGR control device for an engine according to claim 1, further comprising a first memorizing means for memorizing a first feedback correction value when the feedback controlling is performed; and a second memorizing means for memorizing a second feedback correction value which is a further corrected value of the first feedback correction value when the feedback controlling is performed utilizing the first feedback correction value memorized by the first memorizing means.

4. The EGR control device for an engine according to claim 1, further comprising a failure determining means for determining a failure by detecting that the first exhaust gas recirculation ratio disagrees with the second exhaust gas recirculation ratio.

5. The EGR control device for an engine according to claim 2 or claim 3, further comprising a failure detecting means for detecting a failure when the first feedback correction value or the second feedback correction value exceeds a first predetermined range or exceeds a second predetermined range obtained by parameters of the engine.

6. The EGR control device for an engine according to claim 1, further comprising a failure detecting device for detecting a failure when a difference between the first feedback correction value and the second feedback correction value exceeds a third predetermined range or a fourth predetermined range obtained by parameters of the engine.

* * * * *